US007080020B1

(12) United States Patent
Klaus

(10) Patent No.: US 7,080,020 B1
(45) Date of Patent: Jul. 18, 2006

(54) INTERACTIVE SYSTEM AND METHOD FOR SELLING INSURANCE

(75) Inventor: Robert Klaus, Aichach (DE)

(73) Assignee: Employers Reinsurance Corporation, Overland Park, KS (US)

( * ) Notice: Subject to any disclaimer, the term of this patent is extended or adjusted under 35 U.S.C. 154(b) by 0 days.

(21) Appl. No.: 09/477,057

(22) Filed: Jan. 4, 2000

(51) Int. Cl.
*G06F 17/60* (2006.01)

(52) U.S. Cl. ........................................................ 705/4

(58) Field of Classification Search .................... 705/4, 705/36, 35
See application file for complete search history.

(56) References Cited

U.S. PATENT DOCUMENTS

| | | | | |
|---|---|---|---|---|
| 4,831,526 | A | 5/1989 | Luchs et al. ................... | 705/4 |
| 4,837,693 | A | 6/1989 | Schotz ........................... | 705/4 |
| 5,191,522 | A | 3/1993 | Bosco et al. .................. | 705/4 |
| 5,446,653 | A | 8/1995 | Miller et al. ................... | 705/4 |
| 5,479,344 | A | 12/1995 | Keziah, Jr. ..................... | 705/4 |
| 5,523,942 | A | 6/1996 | Tyler et al. .................... | 705/4 |
| 5,752,236 | A | 5/1998 | Sexton et al. .................. | 705/4 |
| 5,855,005 | A | 12/1998 | Schuler et al. ................. | 705/4 |
| 5,873,066 | A | 2/1999 | Underwood et al. ........... | 705/4 |
| 5,897,620 | A | 4/1999 | Walker et al. ................ | 705/37 |
| 5,970,479 | A | 10/1999 | Shepherd ....................... | 705/5 |
| 6,049,772 | A | 4/2000 | Payne et al. ................... | 705/4 |
| 6,049,773 | A | 4/2000 | McCormack et al. .......... | 705/4 |
| 6,119,093 | A * | 9/2000 | Walker et al. ............... | 705/35 |
| 6,272,528 | B1 * | 8/2001 | Cullen et al. ................ | 705/36 |

FOREIGN PATENT DOCUMENTS

WO WO 2065248 A2 * 8/2002

OTHER PUBLICATIONS

Bestwire, Nov. 12, 1999, CNA Life Re Pilots Online System for Direct Writers and Reinsurance.*
Greg MacSweeney, Dec. 1999, Reinsurance goes virtual at General Life; vol. 24, Issue 13 p. 19.*
Best's Review Life/Health Edition, Dec. 1999, CNA Life Re Pilots Online System for Direct Writers and Reinsurance (CNA Life Re launches new online system enabling life insurance direct writers to shop online for faculative reinsurance);V 100, N 8, p. 91.*
Greg MacSweeny, Reinsurance goes virtual at General Life, Dec. 1999, Insurance & Technology, vol. 24, Iss 13, p. 19.*

* cited by examiner

*Primary Examiner*—Joseph Thomas
*Assistant Examiner*—Robert W. Morgan
(74) *Attorney, Agent, or Firm*—Armstrong Teasdale LLP

(57) ABSTRACT

An interactive system and method of selling reinsurance involves preliminary steps of enrolling a plurality of primary insurers or cedents to use the system, formulating reinsurance proposals to make available to the cedents through the interactive system, posting the proposals on a secure server in the system and calculating and allocating risk capacity to the proposals and cedents. Each cedent is provided secure access to a list of proposals being made available to it. Upon selection and submission of a proposal by a cedent, the system server generates an acceptance notice, transfers the information on the proposal to a listing of agreements entered into by that cedent, recalculates the available allocated capacity and withdraws from availability any proposals whose acceptance would reduce the available allocated capacity below a selected amount.

29 Claims, 11 Drawing Sheets

Fig. 3.

| | Class of Business | OLW $M | Limit Upfront | ROL Upfront | Cover Basis | Term from | Term to | Territory | Reinstate | Coverage |
|---|---|---|---|---|---|---|---|---|---|---|
| ⊙ | Aviation | 1,500 | 6,000,000 | 5.00% | L.O.D. | 01/01/00 | 12/31/00 | World | 1@100% | 1st Event |
| ○ | Aviation | 800 | 1,000,000 | 15.00% | L.O.D. | 01/01/00 | 12/31/00 | World | 1@100% | 1st Event |
| ○ | Energy/Marine | 5,000 | 4,000,000 | 35.00% | L.O.D. | 01/01/00 | 12/31/00 | Europe | 1@100% | 1st Event |
| ○ | Non-Marine | 800 | 4,000,000 | 15.00% | L.O.D. | 01/01/00 | 12/31/00 | USA | 1@100% | 2nd Event |
| ○ | Space | 250 | 2,000,000 | 30.00% | L.O.D. | 01/01/00 | 12/31/00 | Launch Vehicle Only | 1@100% | 1st Event |

Proposals to XYZ, Inc.

(Details) (Refresh)

Fig. 4.

Agreements of XYZ, Inc.

| | Class of Business | OLW $M | Limit Upfront | ROL Upfront | Cover Basis | Term from | Term to | Territory | Reinstate | Coverage |
|---|---|---|---|---|---|---|---|---|---|---|
| O | Aviation | 5,000 | 9,000,000 | 36.75% (w/5% Brkrg) | L.O.D. | 01/01/00 | 12/31/00 | Europe | 1@120% | 2nd Event |
| O | Aviation | 600 | 1,000,000 | 25.00% | L.O.D. | 01/01/00 | 12/31/00 | World | 1@100% | 1st Event |
| O | Non-Marine | 800 | 1,000,000 | 15.00% | L.O.D. | 01/01/00 | 12/31/00 | USA | 1@100% | 1st Event |
| O | Energy/Marine | 1,000 | 1,000,000 | 12.50% | L.O.D. | 01/01/00 | 12/31/00 | Asia | 1@100% | 1st Event |

Details

Proposal Details

To submit proposal, enter data where requested and click 'NEXT' — 63

| | |
|---|---|
| Class of Business: | Aviation |
| Treaty Type | Excess of Loss |
| OLW | $1.500M |
| Limit Upfront | $ 6,000,000 ▽ — 46 |
| ROL Upfront | 5.00%   — 45 |
| Priority | $100,000 |
| Cover Basis | L.O.D. |
| Term | From 01/01/2000 to 12/31/2000 |
| Territory | Worldwide |
| Reinstatements | 1@100% |
| Coverage | 1st Event |

43

| | |
|---|---|
| Involve Broker | No ▽ — 48 |
| Name and address of broker | — 49 |
| Your Reference | — 50 |
| Payment Terms | Payable within 45 days after inception |

( next ) — 60  ( cancel ) — 61

The following clauses apply to this proposal: 54

| Name | Description | Wording |
|---|---|---|
| | Excluding: Errors and Omissions written as such | (wording) |
| | Excluding: Financial Guarantee | (wording) |
| | Excluding: Aviation Losses emanating from Other Accounts | (wording) |

Submit Proposal
Please check the general terms once again and click 'submit' to bind coverage.

| | | |
|---|---|---|
| Class of Business: | Aviation | |
| Treaty Type | Excess of Loss | 75 |

| | |
|---|---|
| OLW | $1.500M |
| Limit Upfront | $ 6,000,000 |
| ROL Upfront | 5.00% |
| Priority | $100,000 |
| Cover Basis | L.O.D. |
| Term | From 01/01/2000 to 12/31/2000 |
| Territory | Worldwide |
| Reinstatements | 1@100% |
| Coverage | 1st Event |

68

| | |
|---|---|
| Involve Broker | No |

| | |
|---|---|
| Your Reference | AV001 |
| Payment Terms | Payable within 45 days after inception |

( submit )  ( back )  ( cancel )
   71        72       73

Proposal Accepted/Contract Closed — 79

Thank you for purchasing this Reinsurance.
Our Reference is: N/00007/99/0/00 — 80

Click the "Print Premium Closing" button to print a billing document for the policy.

Click the "Print Covernote" button to print a copy of the policy.

Click the "Proposals" button to view remaining proposals.

| Print Premium Closing | Print Covernote | Proposals | Agreements | Logout |
|---|---|---|---|---|
| 82 | 83 | 84 | 85 | 86 |

Proposals to XYZ, Inc.

| Class of Business | OLW $M | Limit Upfront | ROL Upfront | Cover Basis | Term from | Term to | Territory | Reinstate | Coverage |
|---|---|---|---|---|---|---|---|---|---|
| ○ Aviation | 800 | 1,000,000 | 15.00% | L.O.D. | 01/01/00 | 12/31/00 | World | 1@100% | 1st Event |
| ○ Space | 250 | 2,000,000 | 30.00% | L.O.D. | 01/01/00 | 12/31/00 | Launch Vehicle Only | 1@100% | 1st Event |

Details   Refresh

Fig. 8b.

Proposals to XYZ, Inc.

| | Class of Business | OLW $M | Limit Upfront | ROL Upfront | Cover Basis | Term from | Term to | Territory | Reinstate | Coverage |
|---|---|---|---|---|---|---|---|---|---|---|
| O | Aviation | 800 | 1,000,000 | 15.00% | L.O.D. | 01/01/00 | 12/31/00 | World | 1@100% | 1st Event |
| O | Energy/Marine | 5,000 | 2,000,000 | 35.00% | L.O.D. | 01/01/00 | 12/31/00 | Europe | 1@100% | 1st Event |
| O | Non-Marine | 800 | 2,000,000 | 15.00% | L.O.D. | 01/01/00 | 12/31/00 | USA | 1@100% | 2nd Event |
| O | Space | 250 | 2,000,000 | 30.00% | L.O.D. | 01/01/00 | 12/31/00 | Launch Vehicle Only | 1@100% | 1st Event |

Details   Refresh

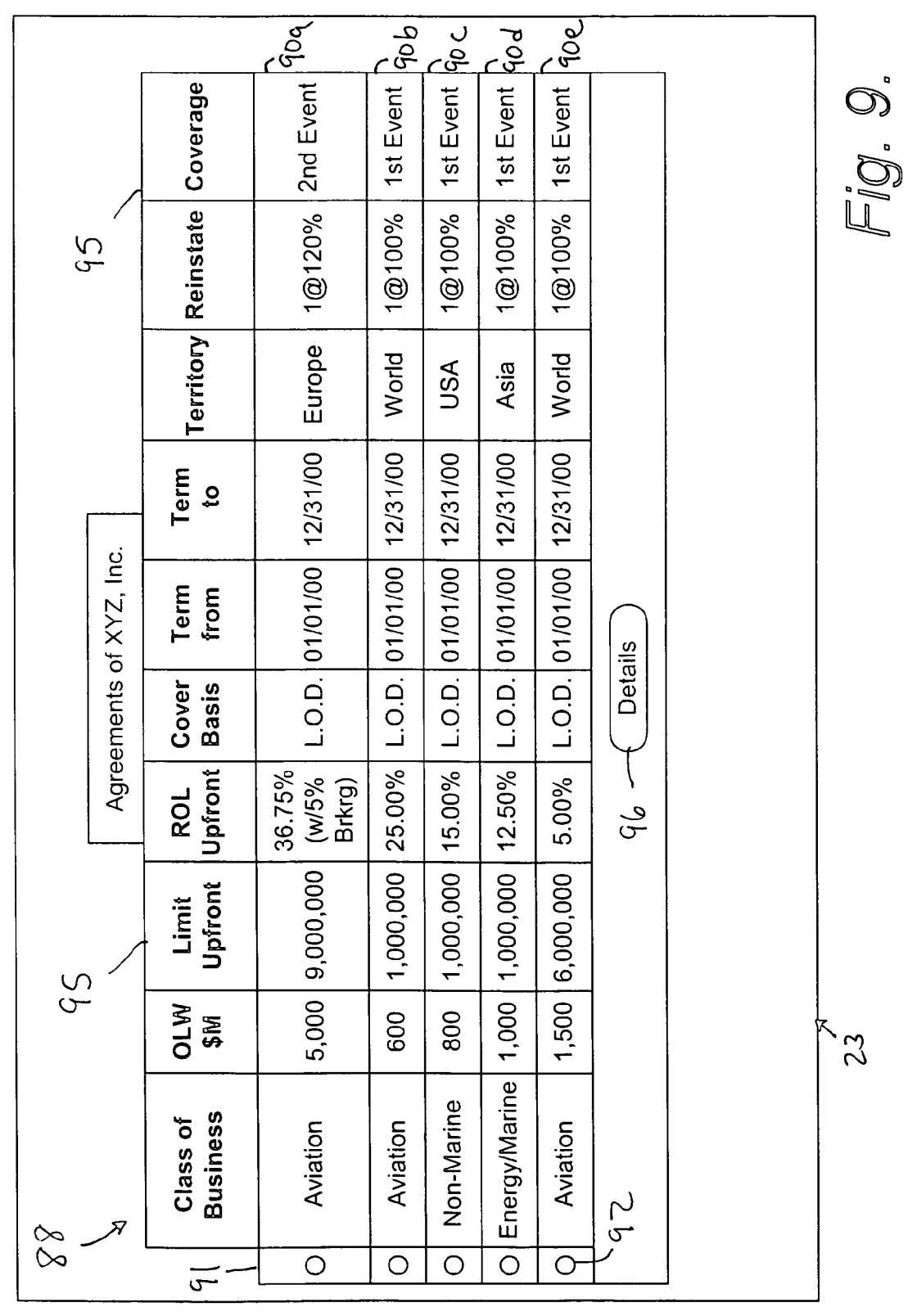

| Class of Business | OLW $M | Limit Upfront | ROL Upfront | Cover Basis | Term from | Term to | Territory | Reinstate | Coverage |
|---|---|---|---|---|---|---|---|---|---|
| Aviation | 5,000 | 9,000,000 | 36.75% (w/5% Brkrg) | L.O.D. | 01/01/00 | 12/31/00 | Europe | 1@120% | 2nd Event |
| Aviation | 600 | 1,000,000 | 25.00% | L.O.D. | 01/01/00 | 12/31/00 | World | 1@100% | 1st Event |
| Non-Marine | 800 | 1,000,000 | 15.00% | L.O.D. | 01/01/00 | 12/31/00 | USA | 1@100% | 1st Event |
| Energy/Marine | 1,000 | 1,000,000 | 12.50% | L.O.D. | 01/01/00 | 12/31/00 | Asia | 1@100% | 1st Event |
| Aviation | 1,500 | 6,000,000 | 5.00% | L.O.D. | 01/01/00 | 12/31/00 | World | 1@100% | 1st Event |

Agreements of XYZ, Inc.

Details

Fig. 9.

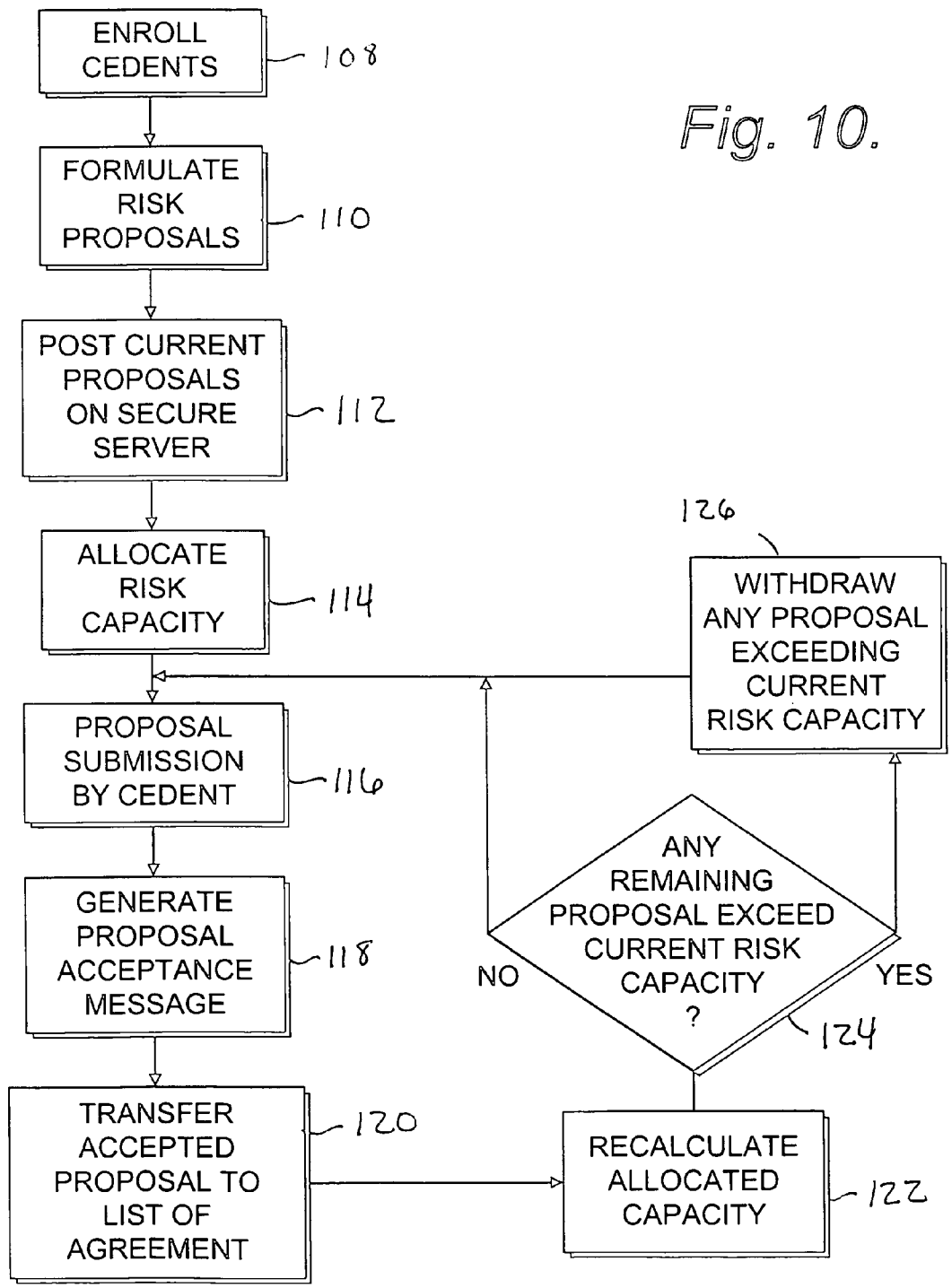

INTERACTIVE SYSTEM AND METHOD FOR SELLING INSURANCE

BACKGROUND OF THE INVENTION

The present invention relates to an interactive system and method for selling insurance including reinsurance.

Insurance is used to redistribute risks. Insurers or risk carriers assume portions of the risks of their customers or insureds in exchange for premiums. Insureds may also be referred to as cedents in that they cede risks to a risk carrier or insurer. Reinsurance is used by insurance companies to redistribute their exposure to other insurers. In a reinsurance agreement, an insurer (often referred to as a primary insurer or ceding company) transfers or cedes some or all of its exposures and premiums to a reinsurer. The reinsurer then agrees to indemnify the ceding company for a predetermined type and amount of losses sustained.

It is important to understand that insurers, including primary insurers and reinsurers, are regulated as to the amount of insurance they can write, or risk that they can assume, based on the amount of surplus funds they hold. The capacity of an insurer generally refers to the monetary amount of insurance or risk of loss which the insurer can agree to cover based upon their surplus funds. An insurance company can increase its capacity to allow it to write more policies or to write policies with higher limits by reinsuring a portion of its covered risks.

There are two broad types of reinsurance contracts: treaty and facultative. Treaty reinsurance involves an agreement in which the primary insurer agrees in advance to cede certain classes of business or types of insurance to the reinsurer. For example, part of the primary insurer's business may be aviation insurance, through which the primary insurer provides aviation insurance to multiple commercial airliners. Under a treaty reinsurance contract, the reinsurer would agree to reinsure some portion of the risk of all of the primary insurer's aviation insurance contracts. Individual risks are not underwritten or discussed; the reinsurer relies on the primary insurer to accept only risks that fall within acceptable underwriting criteria and reinsures all risks that fall within the reinsurance treaty agreement. Facultative reinsurance, on the other hand, involves separate reinsurance agreements for each risk or policy that is being reinsured.

In addition to the broad types of reinsurance contracts, treaty or facultative, there are also various ways in which the parties may share or cede the risks. Two broad classifications of risk sharing arrangements are referred to as Proportional Arrangements or Excess Arrangements.

In a proportional agreement, a certain portion of every risk covered by the agreement is ceded. The primary insurer and reinsurer share a portion of all insurance, premiums and losses in the same amount. The primary insurer is paid a commission in exchange for ceding the risk portion and premium to the reinsurer. A proportional agreement may be written on a quota share or surplus share basis.

In a quota share agreement, the primary insurer's retention (retained risk) is stated as a percentage of the amount insured. The insurer retains the same percentage of insurance, premium and losses and cedes the rest to the reinsurer, subject to a reinsurance limit. In a surplus share treaty, the primary insurer's retention (retained risk) is stated as a fixed monetary amount of the amount insured. The primary insurer retains a fixed monetary amount of all insurance, premium and losses that fall within the agreement and cedes the rest to the reinsurer. In either case, a commission is typically paid to the insurer in return for the premium ceded.

To illustrate the differences between quota share and surplus share, assume that a primary insurer wants to write a policy for a property risk valued at $1,000,000. In a quota share arrangement with a 25% retention, the primary insurer would retain $250,000 of the property risk and cede $750,000 to the reinsurer. However, if the property risk were valued at $2,000,000 under the same quota share arrangement, the insurer would retain $500,000 and cede $1,500,000. In a surplus share treaty, the primary insurer may choose to retain $250,000 of each property risk insured. The primary insurer thus would retain $250,000 on both a $1,000,000 property risk, ceding $750,000, and on a $2,000,000 property risk, ceding $1,750,000.

In an excess reinsurance agreement, only losses are ceded to the reinsurer. The primary insurer retains the amount of insurance and premium, and commissions are not normally paid. Three standard types of excess agreements are per risk excess, per occurrence excess, and aggregate (stop loss) excess.

In an aggregate excess agreement, the retention is calculated based on all losses over a period of time stated in the agreement. The retention may be stated in a monetary amount, a loss ratio, or some combination of the two.

In per risk excess arrangements, losses above a certain monetary amount are ceded to the reinsurer, which is responsible for all losses from any one exposure above this monetary amount up to the reinsurance limit. Per occurrence or per loss excess arrangements are similar to per risk arrangements. However, the retention is stated as an amount incurred per occurrence. An occurrence may be one hurricane, one flood or one accident that results in liability claims.

The difference between per risk and per occurrence excess can be illustrated in the following example in which a hurricane damages 100 covered homes in a given area. If the primary insurer ceded the losses on a per risk basis with a $10,000 retention, it would be responsible for the $10,000 retention on each of the 100 homes, or $1,000,000. However, on a per occurrence basis, the primary insurer may have retained $250,000 per occurrence, in which case the primary insurer would have to pay $250,000 and the reinsurer would be responsible for the rest of the losses up to the reinsurance limit.

Original Loss Warranty ("OLW") protection is a type of per occurrence excess agreement in which the reinsurer pays the reinsurance cover amount only if the total amount of a covered loss exceeds a set amount or trigger point. OLW protection is often utilized in high risk insurance such as aviation, space and energy/marine. In such high risk insurance, the risk is often spread among multiple carriers, each covering a portion of the total risk.

The following example is provided to illustrate possible application of OLW protection in a high risk insurance, namely aviation insurance.

A primary insurer of International Airline accounts seeks reinsurance for its portfolio of aviation insurance contracts. The primary insurer's portfolio includes a 10% line (i.e. it receives 10% of the premiums and must pay 10% of each claim) on aviation insurance for a first airline which runs for 12 months beginning on January 1, a 5% line on aviation insurance for a second airline, effective 12 months beginning on April 1; and numerous other insurance policies with different various percentages of participation and policy periods. The primary insurer's exposure out of these various contracts is very high and the primary insurer seeks reinsurance to reduce its exposure.

OLW protection for such a portfolio might be structured such that the reinsurance contract provides for a cover amount of $3,000,000 if any one of the insureds covered by an aviation insurance policy in the primary insurer's portfolio has a loss which exceeds a trigger point of $750,000,000 during the period of the reinsurance contract in exchange for a premium of $800,000. It does not matter which of the primary insurer's insureds suffers the loss, nor the primary insurer's participation in the insurance contract of the insured suffering the loss. If a loss occurs during the reinsurance policy period which exceeds the trigger point, the reinsurer pays the reinsurance cover amount.

Historically, reinsurance contracts have been initiated by the primary insurer, or by a broker on behalf of the primary insurer, which approaches a reinsurer and requests coverage of a certain amount of its portfolio. An underwriter for the reinsurer then evaluates performance data for the primary insurer and evaluates the risk associated with the requested reinsurance amount and decides how much coverage or capacity the reinsurer is willing and able to offer and under what financial and legal terms. This offer is then either accepted or declined by the cedent. This process is typically effected by telephone, fax, letter and personal contact and may involve ongoing negotiations as to the financial and legal terms or the amount of capacity offered. These are essentially the same methods used for selling most types of insurance.

The historical method of marketing or selling insurance, including reinsurance, limits the ability of the insurer to be proactive in its effort to sell its insurance services and often results in inefficiencies in utilization of the insurer's capacity.

SUMMARY OF THE INVENTION

The present invention comprises a system and method for ceding risks from insureds or cedents to a risk carrier or insurer over a computer network. The system and method are particularly well adapted for use in forming reinsurance contracts. The system includes an application server on which an application is installed. The "application" includes an application engine and supporting data and program files. The application interfaces with a database of selected information of selected cedents. The application server is remotely accessible by the cedents through a computer network and in particular through the internet.

An initial step of the method involves calculating a risk assumption capacity of the risk carrier and entering the capacity into the application as available risk assumption capacity. Another preliminary step involves identifying potential customers or cedents having classes of insurance or risks, portions of which the risk carrier is willing to assume under selected terms. The risk carrier then develops proposals to assume selected risks of the potential cedents and posts the proposals on the system such that the proposals are viewable by the cedents through the computer network. The application permits the cedents to electronically submit a proposal directed to or associated with it, as an offer, for acceptance by the risk carrier. The application electronically accepts the offer and sends confirmation of acceptance of the offer to the cedent.

Upon acceptance of an offer, the application recalculates the available risk assumption capacity by reducing the available risk assumption capacity by the amount of risk assumed. The application then electronically withdraws from view and availability for submission by the cedents any proposals, the acceptance of which would reduce the available risk assumption capacity below the selected amount.

The system is preferably designed such that proposals for a specific cedent are viewable only by that cedent. A specific cedent gains access to its proposals through a secure server using a user identification designation or user ID and password. Each cedent may view a listing of one or more proposals submitted for its consideration. The listing includes a brief summary of important financial terms of the proposal. The cedent may view additional details concerning each proposal, including additional financial terms and wording of contractual terms of the proposal, by selecting a proposal from the listing and then linking to additional pages for the selected proposal.

The system also preferably generates a separate listing for each cedent of each of the agreements it has entered into with the risk carrier, resulting from proposals which the cedent submitted through the system and accepted by the risk carrier. The listing of agreements provides a brief summary of important financial terms of the agreement. The cedent may view additional details concerning each agreement, including additional financial terms and the wording of contractual terms of the proposal, by selecting a particular agreement from the listing and then linking to additional pages for the selected agreement.

The listing of agreements is automatically updated upon acceptance of an offer by the carrier. More specifically, upon acceptance of an offer by the application, the data relating to a proposal is removed from the listing of proposals and added to the listing of agreements.

OBJECTS AND ADVANTAGES OF THE INVENTION

The objects of this invention include providing a system and method for efficiently ceding monetary risks, selling insurance capacity or processing insurance contracts; to provide such a system and method which allows a risk carrier to post currently available proposals for insurance coverage on a computer network to allow potential customers or cedents to readily access and view proposed financial and legal terms of currently available coverage; to provide such a system which allows a potential risk cedent to select and electronically submit a proposal as an offer for acceptance by the risk carrier; to provide such a system and method which allows the risk carrier to electronically accept such an offer; to provide such a system which recalculates the risk carrier's available capacity upon acceptance of an offer to decrement the capacity accordingly; to provide such a system which removes from accessibility or view any proposals whose acceptance would exceed the then available capacity; to provide such a system which will notify the cedent upon submission of a proposal as to whether the offer is accepted or not; to provide such a system which allows the cedents to view the insurance agreements currently in force between it and the risk carrier; and to provide such a system which provides participating cedents secure access to view only those proposals specifically developed for it and to submit as offers only those proposals developed for it.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a user specific Proposals page generated by the system server and providing a listing of proposals available to the user with a specific proposal selected.

FIG. 4 is a user specific Agreements page generated by the system server and providing a listing of existing agreements for reinsurance.

FIG. 5 is a Proposal Details page generated by the system server and corresponding to the proposal selected in FIG. 3.

FIG. 6 is a Submit Proposal page generated by the system server for use in submitting the proposal selected.

FIG. 7 is a Acceptance Confirmation page generated by the server to confirm acceptance of the proposal submitted.

FIG. 8a is revised Proposals page generated after acceptance of the proposal selected in FIG. 3.

FIG. 8b is an alternative version of the revised Proposals page generated after acceptance of the proposal selected in FIG. 3.

FIG. 9 is a revised Agreements page generated after acceptance of the proposal selected in FIG. 3.

FIG. 10 is a flow chart of the steps of the interactive system and method of entering into contracts for the assumption of risks.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriately detailed system.

Figure 1:
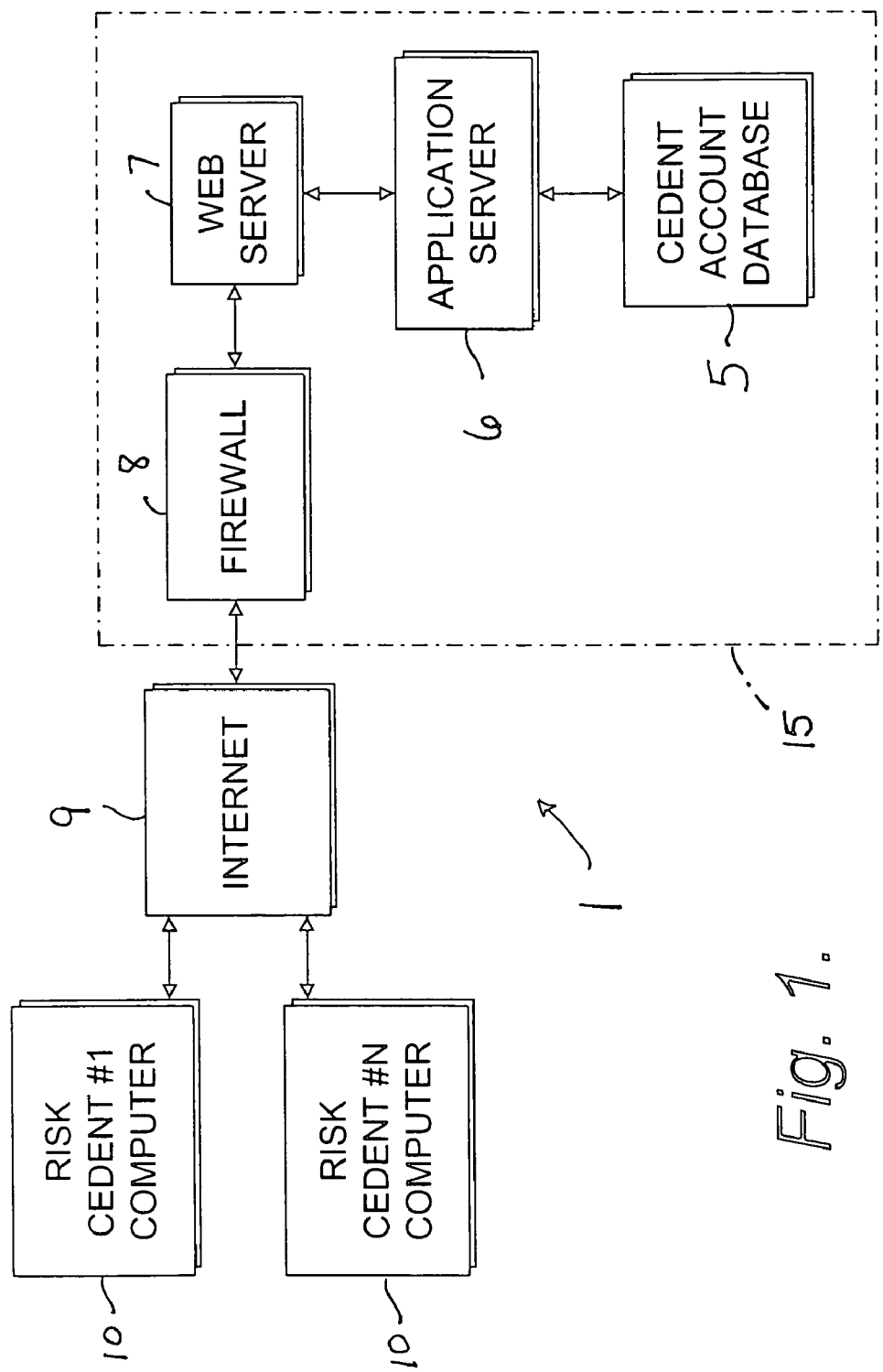
FIG. 1 is a block diagram illustrating an interactive system for use in practicing the method of the present invention including a system server.

Referring to the drawings in more detail, FIG. 1 is illustrative of an interactive system or computer network 1 for use in carrying out the methodology of the present invention for marketing and selling insurance and in particular reinsurance. Although the network 1 shown and described utilizes the internet, it is to be understood that the methodology of the present invention could be practiced utilizing other computer or communications networks.

The preferred embodiment is described with reference to sales of OLW (original loss warranty) type reinsurance. However, it is to be understood that the methodology and system of the present invention can be utilized to sell other forms of reinsurance or insurance and in general for entering into agreements to assume risks of others.

The network 1 is preferably conventional for internet applications and includes a database 5, an application server 6, a web server 7 and a firewall 8 which are selectively accessible through the internet 9 from computers 10 of end users. As used herein the database 5, the application server 6, web server 7, firewall 8 and software run thereon to store, provide access to and manipulate data stored in the database 5 or on the servers 6 and 7 and 8, may collectively be referred to as a server or system server 15. The system server 15 is generally assembled, operated, maintained and connected to the internet 9 by or under the authority of a reinsurer.

The end users comprise existing and/or potential clients or customers of a reinsurer or their brokers, representatives or agents. The customers may also be referred to as cedents or primary insurers. The customers use web browsers on their computers 10 to connect to the system server. The system server 15 responds to requests and commands received from the end user's browser, to generate pages responsive thereto as part of the methodology of the present invention.

Implementation of the interactive system and method requires some preliminary steps which do not necessarily occur sequentially, may occur simultaneously or may occur intermittently over an extended period of time. At an early stage of the process, the reinsurer must determine its overall capacity or the monetary value of risks that it can assume. A reinsurer's capacity is typically calculated on an annual basis just prior to the time for negotiating new or renewing old contracts. The reinsurer must also determine what types or classes of reinsurance it intends to sell utilizing the interactive system 1 and what portion of its overall capacity it wants to allocate to each type or class of reinsurance.

In another preliminary step, the reinsurer solicits and enrolls or selects cedents, or their representatives, to utilize the interactive system to purchase reinsurance from the reinsurer. The reinsurer sets up separate data records, accounts or files for each primary insurer or user in the system server 15. Upon enrolling a user to utilize the interactive system 1, the reinsurer provides the user with a unique user identification designation (User ID) and a password to provide the user secure access to selected information in the system server 15.

The reinsurer prepares or formulates proposals comprising the financial and legal terms of reinsurance contracts it is willing to enter into in the classes of reinsurance it intends to sell through the interactive system 1. The reinsurer will typically utilize established contract language for the proposals and vary the financial terms depending on then current market conditions and its current capacity. The proposals are input into or posted on the system server 15 so as to be viewable by end users on their computers 10 as discussed in more detail below. The terms of the proposals may be modified at appropriate intervals, such as to modify the proposal language in response to changes in the law or to clarify certain provisions of the proposals.

The reinsurer must determine which proposals it wants to make available to which cedents. For example, the reinsurer may have two separate proposals to provide reinsurance for aviation insurance portfolios and ten different selected primary insurers who have aviation insurance portfolios. The reinsurer may decide to make a first aviation proposal available to all ten of the primary insurers and a second aviation proposal available to only six of the primary insurers.

The decision on which cedents to make available certain proposals will depend in large part on underwriting considerations and an understanding of the cedents' business. As part of the preliminary steps, the reinsurer evaluates insurance portfolios of each of the selected primary insurers or cedents for which it is considering making available reinsurance capacity. An insurance portfolio generally refers to all of the insurance policies issued by an insurer which fall within a specific class of business. More specifically, an insurer's insurance portfolio may refer to all of the insurance policies issued by an insurer which fall within the criteria for the type of insurance for which the reinsurer is willing to make available a proposal for reinsurance. As an example, for OLW coverage for worldwide aviation lines, an insurer's portfolio would be all of its aviation policies providing worldwide coverage which are in force during the proposed term of reinsurance coverage.

Based on the underwriting or evaluation of the insurance portfolios, as well as other business considerations, the reinsurer will determine which proposals to make available to which cedents. The proposals are entered into the system server 15, and the system server 15 is programmed to associate each of the proposals with selected cedents, as determined by the reinsurer.

The reinsurer also determines a capacity which is allocated to each type of proposal. For example, if the reinsurer allocates ten million dollars in risk assumption for the first aviation proposal and the covered amount or risk of loss for each of the first aviation policies is two million dollars, the reinsurer only has the capacity to enter into five contracts based on the first aviation proposal. This capacity may be referred to as a per occurrence capacity.

The reinsurer also determines a capacity for each cedent which may be referred to as a cedent capacity. The cedent capacity generally comprises the maximum risk of loss the reinsurer is willing to assume from a particular cedent. The cedent capacity will vary by cedent. Values for the per occurrence capacities and the cedent capacities are entered into the system server 15 and collectively may be referred to as the allocated capacity. The available allocated capacity generally refers to the amount of allocated capacity which remains available at any given time and which the reinsurer or risk carrier has not yet utilized through entering into an agreement with a cedent.

Once the preliminary steps are completed, the users are notified that the system 1 is available for use. Alternatively, the selected users could be notified that the system 1 will be available for use on a predetermined date by which the reinsurer will have completed the preliminary steps. Most of the preliminary steps will be repeated on an annual basis. Each year the reinsurer will determine whether to enroll the same or additional users, recalculate its capacity, determine what proposals to make available to the various cedents, determine how to allocate its per occurrence capacity and cedent capacity, and reinitialize those values in the system server.

Figure 2:
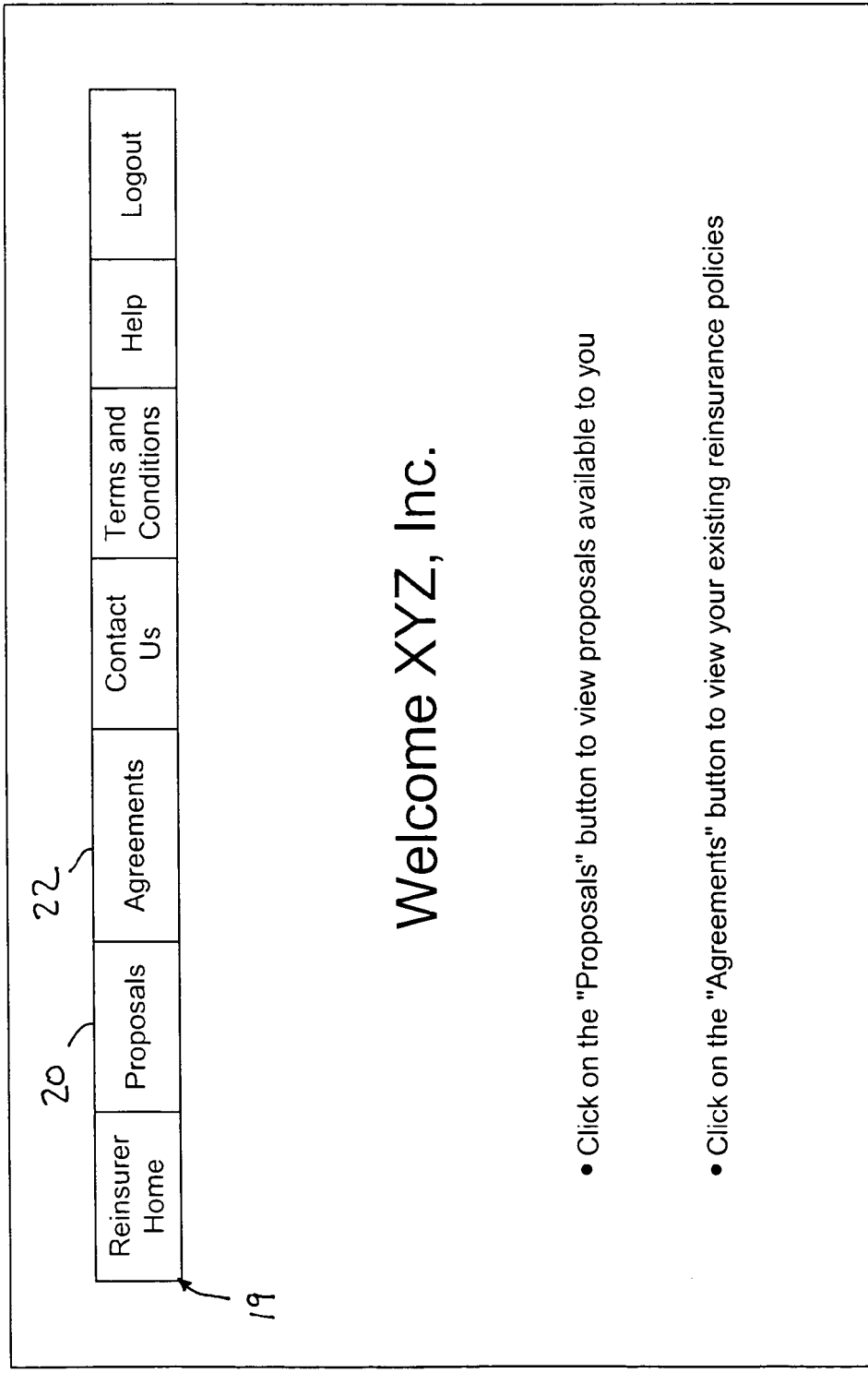
FIG. 2 is a user specific entry page generated by the system server and viewable by a user of the interactive system providing links to other pages.

To access the proposals on the system 1, a user or cedent, connects to a login page (not shown) generated by the system server 15. Following prompts, the user enters its User ID and password and clicks on a login button or enter button to access pages containing a information on proposals being made available to it and to access pages on reinsurance contracts it has already entered into with the reinsurer. Upon clicking the login button, a user specific entry page 18 (See FIG. 2) is generated for view by the user. The entry page 18 includes a button bar 19 with buttons to link to other pages including a Proposals button 20 to link to a user specific Proposals page 21 (See FIG. 3) and an Agreements button 22 to link to a user specific agreements page 23 (See FIG. 4). As will be discussed in more detail below, the Proposals page 21 includes a listing of proposals which are currently available for consideration, and the Agreements page 23 provides a similar listing of reinsurance agreements which the parties have entered into and are in force.

Buttons are also provided on the button bar 19 of the entry page 18 to link to non-user specific pages (not shown) including a Home page for the Reinsurer, a Contact Us page providing information to contact the Reinsurer and e-mail links for the Reinsurer, a Terms and Conditions page providing the terms and conditions of use of the interactive system 1, a Help page providing information to assist in use of the interactive system 1 and a Logout page. In a preferred embodiment, the users enter into a written agreement with the reinsurer covering use of the interactive system 1 before the system is made available to the user for use.

Clicking, selecting or pushing on the Proposals button 20 causes the server 15 to generate the user specific Proposals page 21. An exemplary Proposals page 21 for user XYZ, Inc. is shown in FIG. 3. The Proposals page 21 provides a listing 28 of each of the proposals currently available for consideration by the specific cedent which, in the example shown, is XYZ, Inc. The listing 28 is generally presented in a table format, with each row 30 summarizing the main terms of each separate proposal. Listing 28, in FIG. 3, includes five proposals in rows 30*a–e*.

The first column 31 of each row includes a selection button or icon 32 over which a cursor can be positioned and clicked or activated to select the proposal as summarized in that row 30. As indicated in FIG. 3, by the dot 33, the proposal corresponding to the first or upper row 30*a* has been selected.

Specific information or terms concerning each proposal are provided in remaining columns 35 under the appropriate headings, including the "Class of Business" or line of insurance, the original loss warranty amount or "OLW" in millions of dollars, the reinsurance amount or "Limit Upfront", the "ROL Upfront" or rate on line which is used to calculate the premium, the "Cover Basis", the beginning date ("Term from") and ending date ("Term to") of the policy term, the "Territory", the "Reinstatement" rate and the event "Coverage".

A Details button 36 and a Refresh button 37 are also provided on the Proposals page 21. Clicking on the Refresh button 37 reloads the user specific Proposals page 21 to permit the user to verify that all of the proposals listed remain available and have not been withdrawn from consideration as will be discussed in more detail below. Clicking on the Details button 36, after selecting a proposal by clicking on the corresponding selection button 32, causes the server 15 to generate Proposal Details pages 40 as generally shown in FIG. 5. The Proposals page 21 may include additional information including instructions on how to select a proposal and link to the Proposal Details pages 40 for each proposal, instructions on how to submit a proposal as an offer for acceptance, or instructions on contacting the reinsurer if no proposals are listed as being available or if the user has additional questions concerning use of the system 1.

FIG. 5 shows a first page 41 of the Proposal Details pages 40 corresponding to the proposal shown as selected in FIG. 3. The page 41 includes a partial listing 43 of the terms of the selected proposal corresponding to the terms as shown on the Proposals page 21. Additional terms may also be included in this listing 43. For example, listing 43 includes a term generally referred to as the "Priority" for the proposal which relates to the liability of the reinsurer if and when the loss paid by the cedent for the loss exceeds the Priority amount. Other terms may be listed elsewhere on the page 41 including when payment is due.

A variable coverage box 45 is provided on page 41, in association with the heading for Limit Upfront, to allow the user to vary the Limit Upfront or coverage amount. In particular, by clicking on the drop down arrow or icon 46, a drop down box (not shown) appears providing alternative coverage amounts in decreasing value. For example, the values shown in the drop down box for selection box 45 could range in descending order in one million dollar increments from six million dollars to one million dollars. To select a different value for the Limit Upfront, the user, places the curser on the selected amount and clicks on that amount, which will then appear in the selection box 45 and the drop down box will disappear. The default value in the selection box 45 is the maximum amount of coverage available through the proposal.

The first page 41 (FIG. 5) of the Proposal Details pages 40 also provides a Yes/No selection box 48 for the user to indicate whether a broker will be involved in the sale and if so a broker identification box 49 is provided to allow the user to fill in the name and address of the broker or other requested information. A Your Reference box 50 is provided for the user to fill in a reference number or code selected by the user to identify the proposal or resulting transaction.

At the bottom of page 41 a listing 54 of headings for applicable contractual clauses for the proposal is provided. The listing 54 carries over to additional pages of the Proposal Details pages 40 (or additional portions of the first page 41) which are not shown. A Wording button 55 is positioned adjacent each heading in the listing 54 of applicable clauses. The user clicks on the Wording buttons 55 to generate additional pages (not shown) including the full text of the selected clause. Any of the pages generated by the server may be printed by the user on a printer associated with the user's computer 10.

The first page 41 of the Proposal Details pages 40 also includes a Next button 60 and a Cancel button 61. Selecting or pressing the Cancel button 61 cancels any of the changes made to the Proposal Details page 40 in boxes 46, 48, 49 or 50, and returns the user to the Proposals page 21.

Instructions 63 are provided on the first page 41 of the Proposal Details page 40 instructing a user on how to submit a proposal for acceptance. The instructions 63 generally instruct the user to enter data where requested and to click on the Next button 60 to submit the proposal corresponding to the information presented on the Proposal Details page 40. Clicking on the Next button 60 causes the system server 15 to generate a corresponding Submit Proposal page 65 as generally shown in FIG. 6.

The Submit Proposal page 65 includes a listing 68 of the basic terms of the proposal, including data entered by the user. For example, the Limit Upfront shown on the Submit Proposal page 65 corresponds to the Limit Upfront selected by the user on the Proposal Details page 40. Other data entered in the Proposal Details page 40 is also displayed on the Submit Proposal page 65 including whether a broker will be involved, and if so, the broker's name and address, and the users reference code. The Submit Proposal page 65 provides the user a final opportunity to review the basic terms of the proposal prior to submission for acceptance.

The Submit Proposal page 65 also includes a submit button 71, a back button 72 and a cancel button 73. Clicking on the cancel button 73, returns the user to the Proposals page 21 and cancels any of the changes made to the Proposal Details page 40 in boxes 46, 48, 49 or 50. Clicking on the back button 72 returns the user to the corresponding Proposal Details page 40. The user may elect to return to the Proposal Details page 40 to change data entries or confirm wording of some of the clauses of the proposal. Instructions 75 are also provided on the Submit Proposal page 65 instructing the user to review the basic or general terms and then click the submit button 71 if the user wants to submit the proposal for acceptance.

When the user clicks on the submit button 71, the system server 15 generates an acceptance confirmation page 78 (See FIG. 7) if the proposal was still available at the time of submission. It is possible that a proposal could be withdrawn from availability to a user while viewing the Submit Proposal page 65. When the user then clicks on the submit button 71, the user will receive an error message. The error message may indicate that the proposal is no longer available for acceptance or may simply instruct the user to call the reinsurer to determine why an error message was received. Such an error message may be a page (not shown) which include a button to return the user to the Proposals page 21 or other pages.

The acceptance confirmation page 78 includes a message 79 indicating the proposal has been accepted and the contract closed. The acceptance confirmation page 78 provides a reinsurer reference number 80 which is assigned to the policy or contract by the system server 15 upon acceptance. Page 78 also includes a Print Premium Closing button 82, a Print Covernote button 83, a Proposals button 84, an Agreements button 85 and a Logout button 86.

Clicking on the Print Covernote button 83 provides the ceding company with the opportunity to print a copy of the contract or policy corresponding to the accepted proposal on a printer associated with the users computer 10. Clicking on the Print Premium Closing button 82 provides the ceding company with the opportunity to print a billing document for the policy or contract indicating the amount of the premium and indicating when it is due. The system server calculates the premium upon submission of a proposal. In the example shown, the premium is calculated by multiplying the selected coverage amount (Limit Upfront) by the listed rate or percentage identified as ROL Upfront.

Clicking on the Proposals button 84 regenerates the Proposals page 21. Clicking on the Agreements button 85 generates or regenerates the agreements page 23, and clicking on the Logout button 86 logs the user out of the user specific pages, and returns the user to the login page (not shown) or the Reinsurer's home page (not shown).

In addition to generating the acceptance confirmation page 78, clicking the submit button 71 on the Submit Proposal page 65, causes the system server 15 to perform several other functions. Before describing these functions, an overview of the agreements page 23 will be helpful.

The Agreements page 23 (See FIG. 4) provides a listing 88 of each of the reinsurance agreements the specific user or insurer (in this example XYZ, Inc.) has entered into with the reinsurer. The listing 88 is generally presented in a table format, with each row 90 summarizing the basic terms of each separate agreement. Listing 88, in FIG. 4, includes four agreements in rows 90*a–d*.

The first column 91 of each row includes a selection button or icon 92 which can be clicked on to select the agreement as summarized in that row 90. Specific information or terms concerning each proposal are provided in remaining columns 95 under the appropriate headings, including the "Class of Business" or line of insurance, the original loss warranty or "OLW" amount in millions of dollars, the reinsurance amount or "Limit Upfront," the "ROL Upfront" or rate on line upfront used in calculating the premium, the "Cover Basis", the beginning date ("Term from") and ending date ("Term to") of the policy term, the "Territory", the "Reinstatement" rate and the event "Coverage". Additional columns could be added to include the reinsurer's and/or the user's reference number.

A Details button 96 is also provided on the Agreements page 23. Clicking on the Details button 96, after selecting an agreement by clicking on the corresponding selection button 92, causes the server 15 to generate Agreement Details pages (not shown) which are similar in appearance to and provide much of the same information about the agreement as is provided on a corresponding Proposal Details pages 40. The Agreement Details pages provide a listing of the basic terms of the specific agreement and a listing of headings for the applicable clauses with an associated link to view the specific wording of each clause.

In order to facilitate use of the interactive system 1, it is to be understood that additional links may be included in the various pages generated. In particular, the button bar 19 (shown in FIG. 2) preferably appears on or as part of a frame surrounding each Proposals page 21 and each Agreements page 23 generated.

Referring again to FIGS. 3 and 4, FIG. 3 shows the listing 28 of proposals available to the specific cedent, XYZ, Inc., before submission of the selected proposal, which appears at the top of the table. Similarly, FIG. 4 shows the listing 88 of agreements entered into between the reinsurer and the specific cedent, XYZ, Inc., before submission of the proposal shown as selected in FIG. 3.

When the user submits the selected proposal for acceptance, by clicking on the submit button 71 on the Submit Proposal page 65 (FIG. 6), the system server 15 withdraws or disassociates the relevant information for the selected proposal from the proposals listing 28 (row 30*a* in FIG. 3) and adds or associates the relevant information with the agreements listing 88. FIGS. 8*a* and 8*b* show the proposals page 21 as it appears after submission and acceptance of the proposal shown selected in FIG. 3. The selected proposal from FIG. 3 (row 30*a*), does not appear in the listing 28 in FIGS. 8*a* and 8*b*. The absence of rows 30*c* and 30*d* in FIG. 8*a* and the decrease in the maximum value of the Limits Upfront in rows 30*c* and 30*d* of FIG. 8*b* will be discussed below.

FIG. 9 shows the Agreements page 23 as it appears after submission and acceptance of the proposal (row 30*a*) shown selected in FIG. 3. The resulting agreement has been added to the listing 88 and appears as row 90*e* in FIG. 9. If for any reason, problems are encountered in receiving the Acceptance Confirmation page 78 (FIG. 7), the user can confirm whether submission of a proposal has been accepted by viewing the Agreements page 23 to verify that the resulting agreement appears in the listing 88 thereon.

Essentially simultaneously with generation of the Acceptance Confirmation page 78 and transfer or reassociation of the data associated with the accepted proposal to the agreements page 23, the system server 15 recalculates the available allocated capacity. As noted previously, the allocated capacity comprises the cedent capacity for each of the cedents and the per occurrence capacity. The available allocated capacity is recalculated by reducing the values associated therewith in the system server by the amount of capacity extended or utilized by the proposal. The system server 15 then withdraws from availability any proposals whose acceptance would reduce the available allocated capacity below a selected amount. The selected amount is generally zero.

For example and referring to FIG. 3, assume the cedent capacity of XYZ, Inc. is eight million dollars ($8,000,000) and the selected amount below which the cedent capacity cannot be reduced is zero. Acceptance of the selected proposal in row 30*a*, with coverage in the amount of six million dollars ($6,000,000), will reduce the available cedent capacity of XYZ, Inc. to two million dollars ($2,000,000). The maximum value of coverage in the proposals in rows 30*b* and 30*e*, of FIG. 2, do not exceed the new cedent capacity of two million dollars. Therefore the proposals in rows 30*b* and 30*e* will not be withdrawn from availability and will be included in the Proposals page 21 generated after acceptance of the proposal in row 30*a*.

The maximum value of coverage in the proposals in rows 30*c* and 30*d* in FIG. 3 exceeds the currently available cedent capacity of two million dollars. The system server 15 can be programmed to withdraw from availability to a cedent any proposal whose maximum value of coverage exceeds the then available cedent capacity. With the system 15 so programmed, upon acceptance of the proposal in row 30*a*, the proposals in rows 30*c* and 30*d* (each providing a maximum coverage of four million dollars) would be withdrawn from availability to cedent XYZ, Inc. and the Proposals page 21 generated thereafter would appear as shown in FIG. 8*a*.

It is foreseen that the system server 15 could be programmed to reduce the maximum value of coverage of any remaining proposals for the cedent to the then available cedent capacity. With the system 15 so programmed, upon acceptance of the proposal in row 30*a*, the maximum value of coverage (Limit Upfront) for the proposals in rows 30*c* and 30*d* would each be reduced to two million dollars, and the Proposals page 21 generated thereafter would appear as shown in FIG. 8*b*.

For purposes of explaining the operation of the system server 15 in withdrawing from availability proposals whose acceptance would exceed the per occurrence capacity, assume the initial capacity allocated by the reinsurer to aviation proposals equivalent to the proposal shown in row 30*a* of FIG. 3, is thirty million dollars. The value for the available per occurrence capacity entered into the system server 15 for that proposal could be the number 5, to correspond to the maximum number of such aviation proposals the reinsurer can accept (based upon the maximum amount of coverage available for each proposal). Upon acceptance of such an aviation proposal, the value for the available per occurrence capacity would be reduced by one. If the same aviation proposal was initially made available to 10 cedents, once five accepted this proposal, the proposal would be withdrawn from availability from the remaining five and would not appear on their respective Proposals page 21. It should be noted that the proposal may have been previously withdrawn from availability from one of the remaining five cedents if acceptance of the proposal by that cedent would reduce that cedent's then available cedent capacity below the selected amount.

The value of the available per occurrence capacity, in the example provided, could also be initialized at thirty million dollars with this value being reduced each time a proposal is submitted and accepted by the maximum value of the Limit Upfront, or six million dollars. Again, once five such proposals are accepted, any remaining proposals will be withdrawn from availability.

It is also foreseen that with the value of the available per occurrence capacity initialized at thirty million dollars, the available per occurrence capacity would be reduced by the selected value of coverage or limit upfront upon the acceptance of each submitted proposal. In such an application, the system server could be programmed to reduce the maximum value of coverage of any remaining proposals to the value of the recalculated or the then available per occurrence capacity, if the maximum value of the coverage would otherwise exceed the then available per occurrence capacity. Continuing with the example above, if proposals were accepted from three cedents submitting the aviation proposal of row 30*a* with the maximum Limit Upfront of six million dollars and from two cedents submitting the same aviation proposal but with a reduced Limit Upfront of four million dollars each, the system server 15 would then reduce the maximum value of the coverage of any of the remaining aviation proposals (like row 30a) to four million dollars. Upon acceptance of one or more additional aviation proposals whose combined coverage amount equals four million dollars, any remaining aviation proposals corresponding to the proposal of row 30a are withdrawn from availability.

It is to be understood that the programming logic utilized in determining the value of the available allocated capacity and whether acceptance of additional proposals would reduce the available allocated capacity below a selected amount could be varied. For example, using the example above relating to cedent capacity, the server 15 could be programmed to set or establish a value for a cedent's maximum capacity at ten million dollars. A value for a utilized capacity could initially be set at zero. Upon acceptance of a proposal utilizing five million dollars in capacity for the cedent, the value of the utilized capacity would be increased to five million dollars. The server would then withdraw from availability any proposals whose acceptance would increase the utilized capacity above the maximum capacity.

It is to be understood that the steps of setting a value for a cedent's maximum capacity and setting an initial value for a utilized capacity (i.e. at zero) is the same as or equivalent to initializing or establishing on the server a value for an available risk assumption capacity. It is also to be understood that the step of increasing the utilized capacity upon acceptance of a proposal is the same as or equivalent to recalculating the available risk assumption capacity upon acceptance of an offer. Further, it is to be understood that the step of withdrawing from availability any proposals whose acceptance would increase the utilized capacity above the maximum capacity is the same as or the equivalent to the step of withdrawing from availability any proposals whose acceptance would reduce the available risk assumption capacity, as recalculated, below a selected amount.

The available capacity generally refers to the maximum capacity less the utilized capacity. The selected amount below which the available capacity cannot be reduced is typically zero. In determining whether acceptance of a proposal would increase the utilized capacity above the maximum capacity, the program must first subtract the utilized capacity from the maximum capacity which is the same as recalculating the available capacity which would result from acceptance of the proposal. Determining whether the increase in the utilized capacity will result in a value which exceeds the maximum capacity is the same as determining whether the corresponding reduction in the value of the available capacity will reduce that value below the selected value, zero.

It is to be understood that as used herein reference to the step of withdrawing a proposal from availability should be interpreted broadly enough to incorporate the step of reducing the maximum value of coverage for any one proposal at least to the then current value for available capacity, including either cedent capacity or per occurrence capacity.

In the system and method as described with reference to the sales of original loss warranty type reinsurance, the method is generally utilized on an annual basis. The reinsurer calculates and allocates its capacity on an annual basis and reinitializes values for the per occurrence and cedent capacities in the system server 15 at the beginning of every year. Once a cedent's allocated cedent capacity is utilized, the cedent cannot purchase additional reinsurance through the system until the next year. Once the per occurrence capacity for a particular proposal is utilized, no additional policies for that proposal can be sold until the following year.

However, it is to be understood that the system server 15 could be programmed to permit the reinsurer to reinitialize the values for the available allocated capacities at any time. It is foreseeable, that the system could be utilized to increase or decrease the available allocated capacity at any time (if regulations would permit) depending on various factors including the reinsurer's and cedents' changing financial conditions. The system server 15 could be programmed to automatically make available upon an increase in available allocated capacity of proposals which were previously withdrawn or new proposals added to the system.

FIG. 10 comprises a flow chart summarizing the main steps of the present invention. Block 108 corresponds to the step of identifying and enrolling potential customers or cedents to utilize the interactive system 1. Block 110 corresponds to the step of formulating or developing risk assumption proposals, which can occur simultaneously with or even before the step of identifying and enrolling potential customers as shown in block 108. Block 112 corresponds to the step of posting on a secure server proposals which are to be made available to selected cedents. Risk capacity is allocated to the proposals and the cedents as shown by block 114 and initialized on the server.

Block 116 corresponds to the step of selecting and electronically submitting a proposal by a cedent utilizing the interactive system 1. Generation of an electronic acceptance confirmation message by the system server 15 upon submission of a proposal is shown by Block 118. Upon acceptance of a proposal, the data associated with the accepted proposal is transferred to or included in a list of agreements as indicated by block 120. Simultaneously therewith, the system server recalculates the allocated risk capacity as shown by block 122. The server 15 then determines whether the required capacity of any remaining proposals exceeds the allocated risk capacity as recalculated, as represented by the decision block 124. The remaining proposals whose required capacity exceeds the allocated risk capacity are electronically withdrawn from availability as shown by block 126. The steps of the method are then repeated from the point where proposals are submitted by cedents as represented by block 116.

It is to be understood that while certain forms of the present invention have been illustrated and described herein, it is not to be limited to the specific forms or arrangement of steps described and shown.

What is claimed is:

1. A method for a risk carrier to assume monetary risks from a plurality of risk cedents using a server associated with the risk carrier, the server coupled to a database, said method comprising the steps of:

(a) calculating an available risk assumption capacity for the risk carrier including at least one of a per occurrence capacity and a cedent capacity, the per occurrence capacity is a predetermined amount of risk that the risk carrier may assume for a specific type of risk, the cedent capacity is a predetermined amount of risk that the risk carrier may assume for a specific cedent;

(b) identifying risk cedents having a class of risk that includes at least one type of risk that the risk carrier is interested in assuming under predetermined terms;

(c) controlling access to the server by the risk carrier and maintaining data stored within the database including storing data records relating to each of the identified risk cedents and providing to the identified risk cedents secure access to selected data records;

(d) posting by the risk carrier on the server associated with the risk carrier a plurality of proposals to assume selected risks of the identified risk cedents such that the proposals are viewable through a computer network, each proposal including financial terms and specific contractual language proposed by the risk carrier for assuming selected risks of the identified risk cedents, the proposals are not offers to be accepted by the identified risk cedents;

(e) initializing on the server the available risk assumption capacity of the risk carrier;

(f) enabling electronic submission by any one of the identified cedents of one of the proposals to assume selected risks associated with the cedent as an offer by the cedent to cede a selected risk for acceptance by the risk carrier;

(g) electronically accepting, by the risk carrier, the offer submitted by one of the identified cedents to form a contract;

(h) electronically recalculating the available risk assumption capacity upon accepting the offer; and (i) using the server associated with the risk carrier for electronically withdrawing from availability for submission as an offer any of the proposals whose acceptance by the risk carrier would reduce the available risk assumption capacity, as recalculated, below a selected amount.

2. The method as in claim 1 further comprising the step of:
(a) electronically providing confirmation of acceptance of the offer by the risk carrier to the cedent which submitted the offer.

3. The method as in claim 1 further comprising the step of:
(a) posting the offer which was accepted on the server so as to be viewable by the cedent which submitted the offer.

4. The method as in claim 1 wherein said step of posting by the risk carrier on the server associated with the risk carrier a plurality of proposals further comprises:
(a) providing by the risk carrier access to the server through the computer network, and limiting access of each of the identified cedents to view only the proposals which are specific to the cedent; and
(b) posting by the risk carrier on the server contracts already entered into between the risk carrier and at least one cedent wherein the contracts are viewable by only the risk carrier and the corresponding cedent.

5. A method for a risk carrier to assume monetary risks from a plurality of risk cedents using a server associated with the risk carrier, the server coupled to a database, said method comprising the steps of:
(a) calculating an available risk assumption capacity for the risk carrier including at least one of a per occurrence capacity and a cedent capacity, the per occurrence capacity is a predetermined amount of risk that the risk carrier may assume for a specific type of risk, the cedent capacity is a predetermined amount of risk that the risk carrier may assume for a specific cedent;
(b) identifying risk cedents having a class of risk that includes at least one type of risk that the risk carrier is interested in assuming under predetermined terms;
(c) controlling access to the server by the risk carrier and maintaining data stored within the database including storing data records relating to each of the identified risk cedents and providing to the identified risk cedents secure access to selected data records;

(d) posting by the risk carrier on the server associated with the risk carrier a proposal to assume a monetary risk of the identified risk cedents such that the proposal is viewable by the identified risk cedents through a computer network, each proposal including financial terms and specific contractual language proposed by the risk carrier for assuming a monetary risk of the identified risk cedents, the proposals are not offers to be accepted by the identified risk cedents;

(e) initializing on the server the available risk assumption capacity of the risk carrier;

(f) enabling at least one of the identified risk cedents to respond to the proposal to assume a monetary risk by electronically submitting to the risk carrier an offer to cede the monetary risk for acceptance by the risk carrier;

(g) electronically accepting, by the risk carrier, the offer submitted by one of the identified risk cedents to form a contract;

(h) electronically recalculating the available risk assumption capacity upon accepting the offer; and (i) using the server associated with the risk carrier for electronically withdrawing the proposal from availability for submission as an offer to cede the monetary risk if further acceptance of the offer would reduce the available risk assumption capacity, as recalculated, below a selected amount.

6. The method as in claim 5 further comprising the step of:
(a) electronically providing confirmation of acceptance of the offer by the risk carrier to the cedent which submitted the offer.

7. The method as in claim 5 further comprising the step of:
(a) posting the offer which was accepted on the server so as to be viewable by the cedent which submitted the offer; and
(b) posting on the server contracts already entered into between the risk carrier and at least one cedent wherein the contracts are viewable by only the risk carrier and the corresponding cedent.

8. A method for ceding a plurality of monetary risks from a risk cedent to a risk carrier using a server associated with the risk carrier, the server coupled to a database, said method comprising the steps of:
(a) calculating an available risk assumption capacity for the risk carrier including at least one of a per occurrence capacity and a cedent capacity, the per occurrence capacity is a predetermined amount of risk that represents a maximum amount of total risk that the risk carrier may assume for a specific type of risk, the cedent capacity is a predetermined amount of risk that represents a maximum amount of total risk that the risk carrier may assume for a specific cedent;
(b) identifying a risk cedent having a class of risk that includes at least one type of risk that the risk carrier is interested in assuming under predetermined terms;
(c) controlling access to the server by the risk carrier and maintaining data stored within the database including storing data records relating to the identified risk cedent and providing to the identified risk cedent secure access to selected data records;
(d) posting by the risk carrier on the server associated with the risk carrier a plurality of proposals to assume a plurality of risks of the identified risk cedent such that the proposals are viewable by the cedent through a computer network, each proposal including financial terms and specific contractual language proposed by the risk carrier for assuming at least one risk of the identified risk cedent, the proposals are not offers to be accepted by the identified risk cedents;

(e) initializing on the server the available risk assumption capacity of the risk carrier;

(f) enabling electronic submission by the cedent of any one of the proposals to assume a plurality of risks as an offer to cede the plurality of risks for acceptance by the risk carrier;

(g) electronically accepting, by the risk carrier the offer submitted by the cedent to form a contract;

(h) electronically recalculating the available risk assumption capacity upon accepting the offer; and (i) using the server, associated with the risk carrier, for electronically withdrawing from availability for submission as an offer any of the proposals which have not been submitted for acceptance and whose acceptance would reduce the available risk assumption capacity, as recalculated, below a selected amount.

9. The method as in claim 8 further comprising the step of:

(a) electronically providing confirmation of acceptance of the offer by the risk carrier to the cedent.

10. The method as in claim 8 further comprising the step of:

(a) posting the offer which was accepted on the server so as to be viewable by the cedent.

11. A method for a reinsurer to sell treaty type reinsurance to a plurality of selected cedents using a server associated with the reinsurer, the server coupled to a database, said method comprising the steps of:

(a) calculating an available risk assumption capacity for the reinsurer including at least one of a per occurrence capacity and a cedent capacity, the per occurrence capacity is a predetermined amount of risk that the reinsurer may assume for a specific type of risk, the cedent capacity is a predetermined amount of risk that the reinsurer may assume for a specific cedent;

(b) evaluating by a reinsurer an insurance portfolio of each of a plurality of cedents;

(c) developing proposals to reinsure selected insurance portfolios of the selected cedents;

(d) controlling access to the server by the reinsurer and maintaining data stored within the database including storing data records relating to each of the selected cedents and providing to the selected cedents secure access to selected data records;

(e) posting the proposals by the reinsurer on the server associated with the reinsurer such that the proposals are viewable through a computer network, each proposal including financial terms and specific contractual language proposed by the reinsurer to reinsure selected insurance portfolios of the selected cedents using treaty type reinsurance, the proposals are not offers to be accepted by the selected cedents;

(f) initializing on the server the available risk assumption capacity of the reinsurer;

(g) providing by the reinsurer access through the computer network to the selected cedents to view the proposals;

(h) enabling electronic submission by any one of the selected cedents of one of the proposals as an offer to cede a selected risk for acceptance by the reinsurer;

(i) receiving the offer from the cedent by the reinsurer;

(j) electronically accepting, by the reinsurer, the offer from the cedent to form a contract;

(k) electronically recalculating the available risk assumption capacity upon accepting the offer; and (l) using the server associated with the reinsurer for electronically withdrawing from availability for submission as an offer to cede a selected risk any of the proposals whose acceptance would reduce the available risk assumption capacity, as recalculated, below a selected amount.

12. The method as in claim 11 further comprising the step of:

(a) electronically providing confirmation of acceptance of each of the offers by the reinsurer to the cedent which submitted the offer.

13. The method as in claim 11 further comprising the step of:

(a) posting each of the offers which are accepted on the server so as to be viewable by the cedent which submitted the offer.

14. The method as in claim 11 wherein said step of posting the proposals by the reinsurer on the server further comprises the steps of:

(a) providing by the risk carrier access to the server through the computer network, and limiting access of each of the selected cedents to view only the proposals which are specific to the selected cedent.

15. The method as in claim 11 wherein the proposals include an amount of coverage corresponding to a maximum amount of coverage to be provided and said method further comprises the steps of:

(a) enabling the cedents to electronically decrease the amount of coverage of one of the proposals before submission of the proposal as an offer for acceptance by the reinsurer; and (b) electronically calculating a premium based on the amount of coverage selected by the cedent.

16. A method for a reinsurer to sell reinsurance for a plurality of classes of insurance to a plurality of cedents using a server associated with the reinsurer, the server coupled to a database, said method comprising the steps of:

(a) calculating an available risk assumption capacity for the reinsurer including at least one of a per occurrence capacity and a cedent capacity, the per occurrence capacity is a predetermined amount of risk that the reinsurer may assume for a specific type of risk, the cedent capacity is a predetermined amount of risk that the reinsurer may assume for a specific cedent;

(b) developing, for each of the classes of insurance, a proposal to reinsure insurance portfolios of the cedents;

(c) controlling access to the server by the reinsurer and maintaining data stored within the database including storing data records relating to each of the cedents and providing to the cedents secure access to selected data records;

(d) posting the proposals by the reinsurer on the sever associated with the reinsurer such that selected ones of the proposals are viewable by selected ones of the cedents through a computer network, each proposal including financial terms and specific contractual language proposed by the reinsurer for assuming selected risks of a selected cedent, the proposals are not offers to be accepted by the selected cedents;

(e) initializing on the server a cedent capacity for each of the cedents and a per occurrence capacity for each of the proposals;

(f) enabling electronic submission by any one of the cedents of one of the proposals to assume selected risks associated with the cedent as an offer to cede a selected risk for acceptance by the reinsurer;

(g) electronically accepting by the reinsurer the offer submitted by one of the selected cedents to form a contract;

(h) electronically recalculating the cedent capacity of the cedent and the per occurrence capacity of the proposal upon accepting the offer; and (i) using the server associated with the reinsurer for electronically withdrawing from availability for submission as an offer any of the proposals whose acceptance would reduce the cedent capacity and the per occurrence capacity, as recalculated, below a selected amount.

17. The method as in claim 16 further comprising the step of:

(a) electronically providing confirmation of acceptance of the offer by the reinsurer to the cedent which submitted the offer.

18. The method as in claim 16 further comprising the step of:

(a) posting the offer which was accepted on the server so as to be viewable by the cedent which submitted the offer.

19. The method as in claim 16 wherein posting the proposals by the reinsurer on the sever associated with the reinsurer further comprises the steps of:

(a) providing by the reinsurer access to the server through the computer network, and limiting access of each of the cedents to view only the proposals which are specific to the cedent.

20. The method as in claim 16 wherein said proposals include an amount of coverage corresponding to a maximum amount of coverage to be provided and said method further comprises the steps of:

(a) enabling the cedents to electronically decrease the amount of coverage of one of the proposals before submission of the proposal as an offer for acceptance by the reinsurer; and (b) electronically calculating a premium based on the amount of coverage selected by the cedent.

21. A method for a risk carrier to assume monetary risks from a plurality of risk cedents using a computer coupled to a database included within a computer network, the computer associated with the risk carrier, said method comprising the steps of:

(a) calculating an available risk assumption capacity for the risk carrier including a per occurrence capacity and a cedent capacity, the per occurrence capacity is a predetermined amount of risk that represents a maximum amount of total risk that the risk carrier may assume for a specific type of risk, the cedent capacity is a predetermined amount of risk that represents a maximum amount of total risk that the risk carrier may assume for a specific cedent;

(b) identifying risk cedents having a class of risk that includes at least one type of risk that the risk carrier is interested in assuming under predetermined terms;

(c) controlling access to the computer by the risk carrier and maintaining data stored within the database including storing data records relating to each of the identified risk cedents and providing to the identified risk cedents secure access to selected data records;

(d) posting, by the risk carrier, on the computer network, a plurality of proposals to assume selected risks of the identified risk cedents such that the proposals are viewable through the computer network, each proposal including financial terms and specific contractual language proposed by the risk carrier for assuming selected risks of the identified risk cedents, the proposals are not offers to be accepted by the identified risk cedents;

(e) initializing on the computer network the available risk assumption capacity of the risk carrier including the per occurrence capacity and the cedent capacity for the risk carrier;

(f) enabling electronic submission by any one of the cedents of one of the proposals associated therewith as an offer to cede a selected risk for acceptance by the risk carrier;

(g) electronically accepting, by the risk carrier, the offer submitted by one of the risk cedents to form a contract;

(h) electronically recalculating the available risk assumption capacity including the per occurrence capacity and the cedent capacity for the risk carrier upon accepting the offer; and (i) electronically withdrawing from availability or submission as an offer any of the proposals whose acceptance would reduce the available risk assumption capacity including the per occurrence capacity and the cedent capacity for the risk carrier, as recalculated, below a selected amount, such that electronic submission of any of the proposals which have been withdrawn from availability is prevented.

22. A network based system for assuming monetary risks by a risk carrier from a plurality of risk cedents, said system comprising:

a client system comprising a browser;

a database for storing information relating to the plurality of risk cedents; and a server system associated with the risk carrier configured to be coupled to said client system and said database, said server system comprising an accessing component that enables the risk carrier to control access to the server system and maintain data stored within the database including storing data records relating to the risk cedents and providing to the risk cedents secure access to selected data records, said server system further configured to:

calculate an available risk assumption capacity for the risk carrier including at least one of a per occurrence capacity and a cedent capacity, said per occurrence capacity is a predetermined amount of risk that the risk carrier may assume for a specific type of risk, said cedent capacity is a predetermined amount of risk that the risk carrier may assume for a specific cedent;

identify risk cedents having a class of risk that includes at least one type of risk that the risk carrier is interested in assuming under predetermined terms;

receive from the risk carrier a plurality of proposals to assume selected risks of the identified risk cedents such that said proposals are viewable through said server, each proposal including financial terms and specific contractual language proposed by the risk carrier for assuming selected risks of the identified risk cedents, the proposals are not offers to be accepted by the identified risk cedents;

store said available risk assumption capacity of the risk carrier in said database;

receive from the identified cedents via said client system one of said proposals to assume selected risks associated with the cedent as an offer by the cedent to cede a selected risk for acceptance by the risk carrier;

enable the risk carrier to accept said offer submitted by one of the identified cedents to form a contract;

recalculate said available risk assumption capacity upon accepting said offer; and withdraw from availability for submission as an offer any of said proposals whose acceptance by the risk carrier would reduce said available risk assumption capacity, as recalculated, below a selected amount.

23. A system in accordance with claim 22 wherein said server system further configured to transmit a confirmation of acceptance of said offer by the risk carrier to a client system associated with the cedent which submitted said offer.

24. A system in accordance with claim 22 wherein said server system further configured to post said accepted offer such that said accepted offer is viewable by the cedent which submitted said offer via said client system.

25. A system in accordance with claim 22 wherein said server system further configured to restrict access of each of the identified cedents to view only said proposals which are specific to the cedent.

26. A network based system for a reinsurer to sell reinsurance for a plurality of classes of insurance to a plurality of cedents, said system comprising:

a client system comprising a browser;

a database for storing information relating to the plurality of cedents; and a server system associated with the reinsurer configured to be coupled to said client system and said database, said server system comprising an accessing component that enables the reinsurer to control access to the server system and maintain data stored within the database including storing data records relating to the plurality of cedents and providing to the cedents secure access to selected data records, said server system further configured to:

calculate an available risk assumption capacity for the reinsurer including at least one of a per occurrence capacity and a cedent capacity, said per occurrence capacity is a predetermined amount of risk that represents a maximum amount of total risk that the reinsurer may assume for a specific type of risk, said cedent capacity is a predetermined amount of risk that represents a maximum amount of total risk that the reinsurer may assume for a specific cedent;

generate, for each of said classes of insurance, a proposal for the reinsurer to reinsure insurance portfolios of the cedents;

post proposals such that selected ones of said proposals are viewable by selected ones of the cedents, each proposal including financial terms and specific contractual language proposed by the risk carrier for assuming selected risks associated with selected cedents, the proposals are not offers to be accepted by the selected cedents;

store a cedent capacity for each of the cedents and a per occurrence capacity for each of said proposals;

receive from any one of the cedents via said client system one of said proposals to assume selected risks associated with the cedent as an offer by the cedent to cede a selected risk for acceptance by the reinsurer;

enable the reinsurer to accept said offer submitted by one of the selected cedents to form a contract;

recalculate said cedent capacity of the cedent and said per occurrence capacity of the proposal upon accepting said offer; and withdraw from availability for submission as an offer any of said proposals whose acceptance would reduce said cedent capacity and said per occurrence capacity, as recalculated, below a selected amount.

27. A system in accordance with claim 26 wherein said server system further configured to transmit a confirmation of acceptance of said offer by the reinsurer to said client system associated with the cedent which submitted said offer.

28. A system in accordance with claim 26 wherein said server system further configured to post said accepted offer such that said accepted offer is viewable via said client system by the cedent which submitted said offer.

29. A system in accordance with claim 26 wherein said proposals comprise an amount of coverage corresponding to a maximum amount of coverage to be provided, and wherein said server system further configured to:

enable the cedents to decrease the amount of coverage of one of said proposals before submission of said proposal as an offer for acceptance by the reinsurer; and calculate a premium based on the amount of coverage selected by the cedent.

* * * * *